Patented Sept. 9, 1947

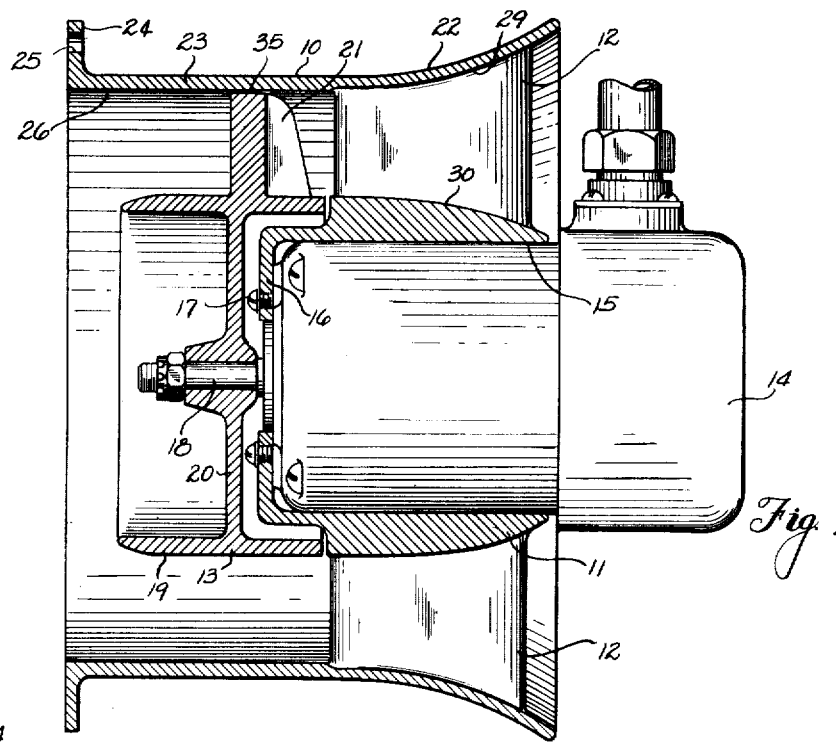
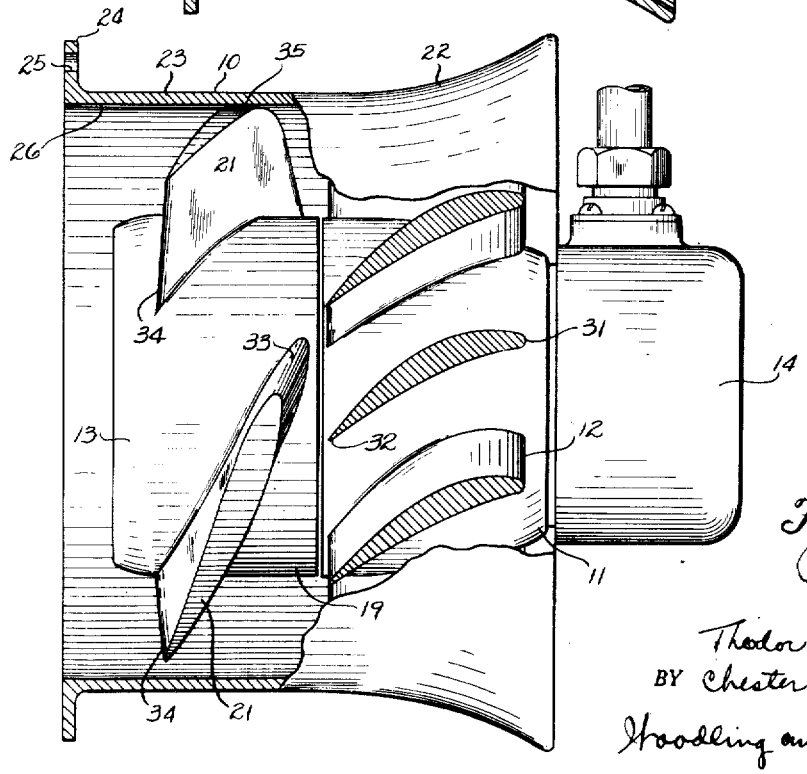

2,427,032

UNITED STATES PATENT OFFICE 2,427,032

FAN AND MOTOR HOUSING

Theodor H. Troller and Chester P. Jenkins, New Philadelphia, Ohio, assignors to Joy Manufacturing Company, a corporation of Pennsylvania Application September 1, 1943, Serial No. 500,778

19 Claims. (Cl. 230—117)

Our invention relates in general to a fan and motor housing and more particularly to a fan and motor housing for an axial flow fan.

An object of our invention is the provision of a fan and motor housing in which the motor and fan are so mounted and aligned within the housing that the tip clearance between the fan and the housing may be maintained at a close minimum.

Another object of our invention is the provision of a fan and motor housing cast, molded, formed or otherwise made in a mono-bloc structure.

Another object of our invention is the provision of utilizing the fan and motor housing as heat radiating means for the motor, whereby the motor may be cooled by the main stream of air passing through the housing and whereby the temperature rise of the motor may be maintained at a low value with the result that a motor of a given rating may be operated at a load greater than its given rating.

Another object of our invention is the provision of a motor and fan structure achieving light weight and rigidity by having its component parts reduced to a minimum by the employment of mono-bloc structure, each of which parts can closely be fitted to the other with simple machining and assembly operation, producing a total structure in which great lightness and rigidity is combined with close fitting of the fan within the housing and in which the weight of the motor is reduced to a minimum by means of using the fan structure as a whole to transfer heat from the motor in continuous flow to the total air mass flowing through the fan housing by reason of the fan action without splitting off the air from the main stream of air.

In the construction of electric motors, there are certain design requirements and proportions of parts which must be maintained in order to produce an economical product. Thus, the diameter bears a certain ratio to the length of the motor for efficient design. In our invention, we accept the design of the motors as they are built by motor manufacturers and build our housing around the motor to obtain the best air flow requirements.

Therefore, another object of our invention is the provision of a motor supporting structure which, with a minimum of material, provides a fitting for a motor of best design on the basis of electrical requirements to a fan rotor of the best design on the basis of air flow requirements.

Another object of our invention is the provision of a plurality of vanes for supporting a cup-like hub within an outer annular wall, the cup-like hub supporting the motor and axially aligning the motor shaft within the outer annular wall, whereby the fan which is mounted upon the motor shaft may have a close tip clearance within the inner surface of the outer annular wall.

Another object of our invention is the provision of the plurality of vanes in combination with the outer annular wall and the centrally disposed cup-shaped hub to restrict the flow of air as it approaches the fan.

Another object of our invention is the provision of a fan having several blades shaped like twisted air foils attached to a rotor which is supported by the motor shaft in such a way that no air can leak through the rotor, and all the air is moved to the outside of the rotor by means of the blade action of the fan.

Another object of our invention is the provision of making the shape of the plurality of vanes and the shape of the blades of the fan to give substantially a continuous general flow of air.

Another object of our invention is the provision of making the plurality of vanes and the blades of the fan of the same general curvature.

Another object of our invention is the provision of simple means for fastening the motor within the cup-shaped hub of the housing.

Other objects and a fuller understanding of our invention may be had by referring to the following description and claims, taken in conjunction with the accompanying drawing, in which:

Figure 1 is a cross-sectional view of a fan and motor housing embodying the features of our invention; and Figure 2 is a side elevational view of our fan and motor housing with certain parts of the housing removed to illustrate particular features of our invention.

With reference to the drawing, our fan and motor housing comprises a mono-bloc structure having an outer annular wall 10 and a centrally disposed cup-shaped hub 11 connected to the outer annular wall 10 by a plurality of vanes 12.

The cup-shaped hub 11 is arranged to receive a motor 14 having a motor shaft 18 which drives a fan 13 within the outer annular wall 10. The internal surface 15 of the cup-shaped hub 11 is machined to closely receive the outside casing of the motor 14. As illustrated, the cup-shaped hub 11 has a transversely disposed end wall 16 against which an end of the motor abuts and through which the motor shaft 18 extends. The motor is fastened to the transversely disposed end wall 16 by means of a plurality of screws 17. The mounting of the motor is such that the motor shaft 18 is perfectly aligned within the outer annular wall 10 so that the tip clearance indicated at 35 between the fan and the internal surface 26 of the outer annular wall 10 is maintained at a low minimum value. In actual construction, the tip clearance may be as low as a few thousandths of an inch.

The fan comprises a fan rotor 19 having a solid web or hub 20 which is fastened to the motor shaft 18. A plurality of fan blades 21 surround the fan rotor 19. The fan rotor 19, the solid hub 20 and the fan blades 21 may be cast, molded, formed or otherwise made in a mono-bloc structure. The fan blades 21 are shaped like twisted air foils. Because of the fact that the web 20 is solid, no air can leak through the fan rotor 19 with the result that there is no air disturbance. All of the air must move to the outside of the fan rotor 19 under the influence of the blade action. The outside of the fan rotor 19 and the outside surface of the hub 11 form substantially a continuous surface of revolution with a minimum of air disturbance.

The outer annular wall 10 may be said to comprise a first portion 22 being bell-shaped to receive the incoming air, and a second portion 23 which is substantially cylindrical and being the portion in which the fan rotates. The internal surface 26 of the second portion may be machined so that it is in perfect alignment with the internal surface 15 of the hub 11, with the result that when the motor 14 is mounted within the hub the motor shaft 18 is perfectly aligned within the internal surface 26 of the second portion 23 so that the tip clearance between the fan blades 21 and the internal surface 26 of the second portion is maintained at a very low minimum of less than a few thousandths of an inch. The left-hand end of the second portion 23 of the outer annular wall 10 may be provided with a flange 24 having openings 25 so that the housing may be anchored to any associated duct.

The internal surface 29 of the first portion 22 and the external surface 30 of the cup-shaped hub 11 converge towards each other and restrict the flow of air as the air approaches the fan blades 21. As shown in Figure 2, the vanes 12 each have an entry nose portion 31, a trailing edge portion 32 with an intermediate portion therebetween. The entry nose portion 31 is in substantial axial alignment with the outer annular wall 10 and the trailing edge portion 32 is disposed at an angle thereto. Also, as shown in Figure 2, each of the fan blades 21 comprise a twisted air foil having a leading edge 33 and a trailing edge 34. The curvature of the vanes 12 and the curvature of the blades 21 comprise a substantially complementary extension of each other so as to give a continuous flow of the air with a least amount of disturbance.

The entire motor and fan housing may be constructed of good heat conducting material such, for example, as aluminum or other similar material, so that the housing comprises heat radiating means for the motor in which case the temperature rise of the motor is kept to a low minimum with the result that the motor may be operated over its normal rating without overheating. The motor casing fits closely within the cup-shaped hub 11 so that there is a good heat transfer between the motor casing and the hub. In addition, the air which passes through the housing and which contacts the vanes 12 readily dissipates the heat from the housing.

In our construction, there is no need to attempt to cool the motor by splitting off air from the main air stream and passing it through the motor since the heat dissipation is very efficient. In our fan and motor structure, we are able to achieve light weight and rigidity by having the component parts reduced to a minimum by the mono-bloc structure, each of which parts can be closely fitted to the other with simple machining and assembly operation, resulting in a total structure in which great lightness and rigidity is combined with close-fitting of the fan blades within the outer annular housing and in which the weight of the motor is reduced to a minimum by means of using the fan and motor structure as a whole to transfer heat from the motor in continuous flow to the total air mass flowing through the housing by reason of the fan action without splitting off air for cooling from the main stream of air. The motor supporting structure has a minimum of material and accommodates motors of the best design on the basis of electrical requirements to a fan rotor of the best design on the basis of air flow requirements.

Although we have described our invention with a certain degree of particularity, it is to be understood that the present disclosure has been made only by way of example and that numerous changes in the details of construction and the combination and arrangement of parts may be resorted to without departing from the spirit and the scope of the invention as hereinafter claimed.

We claim as our invention:

1. In an axial flow fan structure comprising an electric motor having a shaft and a fan mounted thereon and having radially extending blades, said motor having bearing means supporting the shaft and having a casing with an end portion through which said shaft extends, the improvement of a fan and motor housing comprising a mono-bloc cast structure having an outer annular wall and a centrally disposed cup-shaped hub connected to the outer annular wall by a plurality of vanes, said cup-shaped hub receiving the motor and having a transversely disposed end wall against which an end portion of the motor casing abuts and through which the motor shaft extends, fastening means for fastening the end portion of the motor casing to the transversely disposed end wall, said outer annular wall having a first and a second annular portion, said plurality of vanes being connected to the first annular portion, said second annular portion surrounding the fan, said cup-shaped hub closely receiving the motor and axially aligning the motor casing and the shaft within the outer annular wall, whereby a close tip clearance between the fan and the second annular portion may be maintained.

2. In an axial flow fan structure comprising an electric motor having a shaft and a fan mounted thereon and having radially extending blades, said motor having bearing means supporting the shaft and having a casing with an end portion through which said shaft extends, the improvement of a fan and motor and housing comprising a mono-bloc cast structure having an outer annular wall and a centrally disposed cup-shaped hub connected to the outer annular wall by a plurality of vanes, said cup-shaped hub receiving the motor and having a transversely disposed end wall against which an end portion of the motor casing abuts and through which the motor shaft extends, fastening means for fastend the end portion of the motor casing to the transversely disposed end wall, said outer annular wall having a first and a second annular portion, said plurality of vanes being connected to the first annular portion, said second annular portion surrounding the fan, said cup-shaped hub closely receiving the motor and axially aligning the motor casing and the shaft within the outer annular wall, whereby a close tip clearance between the fan and the second annular portion may be maintained, each of said vanes having an entry nose portion, a trailing edge portion and an intermediate curved portion therebetween, said entry nose portion being directed substantially axially of said housing with said trailing edge portion being disposed at an angle thereto.

3. In an axial flow fan structure comprising an electric motor having a shaft and a fan mounted thereon and having radially extending blades, said motor having bearing means supporting the shaft and having a casing with an end portion through which said shaft extends, the improvement of a fan and motor housing comprising a mono-bloc cast structure having an outer annular wall and a centrally disposed cup-shaped hub connected to the outer annular wall by a plurality of vanes, said cup-shaped hub receiving the motor and having a transversely disposed end wall against which an end portion of the motor casing abuts and through which the motor shaft extends, fastening means for fastending the end portion of the motor casing to the transversely disposed end wall, said outer annular wall having a first and a second annular portion, said plurality of vanes being connected to the first annular portion, said second annular portion surrounding the fan, said cup-shaped hub closely receiving the motor and axially aligning the motor casing and the shaft within the outer annular wall, whereby a close tip clearance between the fan and the second annular portion may be maintained, the inner surface of the first annular portion and the outer surface of the cup-shaped hub converging toward each other and restricting the flow of air as it approaches the fan.

4. In an axial flow fan structure comprising an electric motor having a shaft and a fan mounted thereon and having radially extending blades, said motor having bearing means supporting the shaft and having a casing with an end portion through which said shaft extends, the improvement of a fan and motor housing comprising a mono-bloc cast structure having an outer annular wall and a centrally disposed cup-shaped hub connected to the outer annular wall by a plurality of vanes, said cup-shaped hub receiving the motor and having a transversely disposed end wall against which an end portion of the motor casing abuts and through which the motor shaft extends, fastening means for fastening the end portion of the motor casing to the transversely disposed end wall, said outer annular wall having a first and a second annular portion, said plurality of vanes being connected to the first annular portion, said second annular portion surrounding the fan, said cup-shaped hub closely receiving the motor and axially aligning the motor casing and the shaft within the outer annular wall, whereby a close tip clearance between the fan and the second annular portion may be maintained, each of said vanes having an entry nose portion, a trailing edge portion and an intermediate curved portion therebetween, said entry nose portion being directed substantially axially of said housing with said trailing edge portion being disposed at an angle thereto, the inner surface of the first annular portion and the outer surface of the cup-shaped hub converging toward each other and restricting the flow of air as it approaches the fan.

5. In an axial flow fan structure comprising an electric motor having a shaft and a fan mounted thereon and having radially extending blades, said motor having bearing means supporting the shaft and having a casing with an end portion through which said shaft extends, the improvement of a fan and motor housing comprising a mono-bloc cast structure having an outer annular wall and a centrally disposed cup-shaped hub connected to the outer annular wall by a plurality of vanes, said cup-shaped hub receiving the motor and having a transversely disposed end wall against which an end portion of the motor casing abuts and through which the motor shaft extends, fastening means for fastening the end portion of the motor casing to the transversely disposed end wall, said outer annular wall having a first and a second annular portion, said plurality of vanes being connected to the first annular portion, said second annular portion surrounding the fan, said cup-shaped hub closely receiving the motor and axially aligning the motor casing and the shaft within the outer annular wall, whereby a close tip clearance between the fan and the second annular portion may be maintained, said mono-bloc cast structure being made of good heat conduction material and constituting heat radiating means for the motor.

6. An axial flow fan structure comprising an electric motor having a shaft and a fan mounted thereon and having radially extending blades, said motor having bearing means supporting the shaft and having a casing with an end portion through which said shaft extends, and a mono-bloc cast structure having an outer annular wall and a centrally disposed cup-shaped hub connected to the outer annular wall by a plurality of vanes, said cup-shaped hub receiving the motor and having a transversely disposed end wall against which an end portion of the motor casing abuts and through which the motor shaft extends, fastening means for fastening the end portion of the motor casing to the transversely disposed end wall, said outer annular wall having a first and a second annular portion, said plurality of vanes being connected to the first annular portion, said second annular portion surrounding the fan, said cup-shaped hub closely receiving the motor and axially aligning the motor casing and the shaft within the outer annular wall, whereby a constant tip clearance between the fan and the second annular portion may be maintained, said fan comprising a rotary part having blades extending therefrom, said rotary part having an outer surface of revolution which substantially coincides with the outer surface of the cup-shaped hub.

7. An axial flow fan structure comprising an electric motor having a shaft and a fan mounted thereon and having radially extending blades, said motor having bearing means supporting the shaft and having a casing with an end portion through which said shaft extends, and a mono-bloc cast structure having an outer annular wall and a centrally disposed cup-shaped hub connected to the outer annular wall by a plurality of vanes, said cup-shaped hub receiving the motor and having a transversely disposed end wall against which an end portion of the motor casing abuts and through which the motor shaft extends, fastening means for fastening the end portion of the motor casing to the transversely disposed end wall, said outer annular wall having a first and a second annular portion, said plurality of vanes being connected to the first annular portion, said second annular portion surrounding the fan, said cup-shaped hub closely receiving the motor and axially aligning the motor casing and the shaft within the outer annular wall, whereby a constant tip clearance between the fan and the second annular portion may be maintained, said fan comprising a rotary part having blades extending therefrom, said rotary part having an outer surface of revolution which substantially coincides with the outer surface of the cup-shaped hub, said rotary part having substantially a solid web to blank the flow of air through said rotary part.

8. An axial flow fan structure comprising an electric motor having a shaft and a fan mounted thereon and having radially extending blades, said motor having bearing means supporting the shaft and having a casing with an end portion through which said shaft extends, and a mono-bloc cast structure having an outer annular wall and a centrally disposed cup-shaped hub connected to the outer annular wall by a plurality of vanes, said cup-shaped hub receiving the motor and having a transversely disposed end wall against which an end portion of the motor casing abuts and through which the motor shaft extends, fastening means for fastening the end portion of the motor casing to the transversely disposed end wall, said outer annular wall having a first and a second annular portion, said plurality of vanes being connected to the first annular portion, said second annular portion surrounding the fan, said cup-shaped hub closely receiving the motor and axially aligning the motor casing and the shaft within the outer annular wall, whereby a constant tip clearance between the fan and the second annular portion may be maintained, said fan comprising a rotary part having blades extending therefrom, said rotary part having an outer surface of revolution which substantially coincides with the outer surface of the cup-shaped hub, the shape of the vanes and the shape of the fan blades constituting substantially a complementary extension of each other.

9. In an axial flow fan structure comprising an electric motor having a shaft and a fan mounted thereon and having radially extending blades, said motor having bearing means supporting the shaft and having a casing with end portions through one of which said shaft extends into supporting relation with said fan, the improvement of a fan and motor housing comprising a mono-bloc structure having an outer annular wall and a centrally disposed motor support connected to the outer annular wall by a plurality of vanes, said motor support carrying the motor and having an inwardly directed transversely disposed portion against which one end portion of the motor casing abuts, fastening means for fastening the last mentioned end portion of the motor casing to the transversely disposed portion, said outer annular wall having a first and a second annular portion, said plurality of vanes being connected to the first annular portion, said second annular portion surrounding the fan, said motor support axially aligning the motor casing and the shaft within the outer annular wall, whereby a close tip clearance between the fan and the second annular portion may be maintained.

10. In an axial flow fan structure comprising an electric motor having a shaft and a fan mounted thereon and having radially extending blades, said motor having bearing means supporting the shaft and having a casing with an end portion through which said shaft extends, the improvement of a fan and motor housing comprising a mono-bloc structure having an outer annular wall and a centrally disposed motor support connected to the outer annular wall by a plurality of vanes, said motor support carrying the motor and having an inwardly directed transversely disposed portion against which the end portion of the motor casing abuts, fastening means for fastening the end portion of the motor casing to the transversely disposed portion, said outer annular wall having a first and a second annular portion, said plurality of vanes being connected to the first annular portion, said second annular portion surrounding the fan, said motor support axially aligning the motor casing and the shaft within the outer annular wall, whereby a close tip clearance between the fan and the second annular portion may be maintained, said cast structure being made of good heat conduction material and constituting heat radiating means for the motor.

11. An axial flow fan structure comprising an electric motor having a shaft and a fan mounted thereon and having outwardly extending blades, said motor having bearing means supporting the shaft and having a casing with end portions through one of which said shaft extends into supporting relation with said fan, said casing having an external surface of revolution substantially concentric with said shaft, a fan and motor housing comprising a mono-bloc structure having an outer annular wall, a centrally disposed motor support and a plurality of vanes for connecting said motor support to said outer annular wall, said outer annular wall having a first and a second annular portion, said plurality of vanes connecting said centrally disposed motor support to said first annular portion, said second annular portion having an internal surface of revolution surrounding the fan, said motor support having first and second angularly related surfaces, said first angularly related surface constituting an internal surface of revolution substantially coaxial with said first mentioned internal surface of revolution and, in the assembled structure, with said motor shaft, said first angularly related surface closely receiving said external surface of revolution of the motor casing and fixing said external surface of revolution of the motor casing and the motor shaft in coaxial relation with the said first mentioned internal surface of revolution, whereby a substantially constant tip clearance is maintained between the fan and said first mentioned internal surface of revolution, said second angularly related surface constituting transversely disposed abutment means against which one end portion of said motor casing longitudinally abuts, and fastening means fastening the motor to the abutment means for holding the motor and shaft against longitudinal movement.

12. In an axial flow fan structure comprising an electric motor having a shaft and a fan mounted thereon and having radially extending blades, said motor having bearing means supporting the shaft and having a casing with an end portion through which said shaft extends, the improvement of a fan and motor housing comprising a structure having an outer annular wall and a centrally disposed sleeve connected to the outer annular wall by a plurality of vanes, said sleeve receiving the motor and having inwardly directed transversely disposed abutment means against which an end portion of the motor casing abuts and through which the motor shaft extends, fastening means for fastening the end portion of the said casing to the transversely disposed abutment means, said outer annular wall having a first and a second annular portion, said plurality of vanes being connected to the first annular portion, said second annular portion surrounding the fan, said sleeve closely receiving the motor and axially aligning the motor casing and the shaft within the outer annular wall, whereby a close tip clearance between the fan and the second annular portion may be maintained.

13. In an axial flow fan structure comprising cylindrical means having a rotating shaft therein and a fan having outwardly extending blades mounted on the shaft and driven thereby, said cylindrical means having bearing means supporting the shaft and having a casing with an end portion through which said shaft extends, the improvement of a housing comprising a structure having an outer annular wall and a centrally disposed sleeve connected to the outer annular wall by a plurality of vanes, said sleeve receiving the cylindrical means and having inwardly directed transversely disposed abutment means against which an end portion of the casing of the cylindrical means abuts and through which the rotating shaft extends, fastening means for fastening the end portion of the said casing to the transversely disposed abutment means, said outer annular wall having a first and a second annular portion, said plurality of vanes being connected to the first annular portion, said second annular portion surrounding the fan, said sleeve closely receiving the cylindrical means and axially aligning the casing and the shaft within the outer annular wall, whereby a close tip clearance between the fan and the second annular portion may be maintained.

14. An axial flow fan structure comprising an electric motor having a shaft and a fan mounted thereon and having outwardly extending blades, said motor having bearing means supporting the shaft and having a casing with an end portion through which said shaft extends, said casing having an external surface of revolution substantially concentric with said shaft, the improvement of a fan and motor housing comprising a mono-bloc structure having an outer annular wall, a centrally disposed motor support and a plurality of vanes for connecting said motor support to said outer annular wall, said outer annular wall having a first and a second annular portion, said plurality of vanes connecting said centrally disposed motor support to said first annular portion, said second annular portion having an internal cylindrical surface surrounding the fan, said motor support having first and second angularly related surfaces, said first angularly related surface constituting an internal surface of revolution substantially concentric both to said motor shaft and to said internal cylindrical surface, said first angularly related surface closely receiving said external surface of revolution of the motor casing and substantially concentrically aligning said external surface of revolution of the motor casing and the shaft with the said internal cylindrical surface, whereby a substantially constant tip clearance is maintained between the fan and said cylindrical surface, said second angularly related surface constituting transversely disposed abutment means against which the end portion of said motor casing longitudinally abuts and through which said shaft extends, and fastening means fastening the motor to the abutment means for holding the motor and shaft against longitudinal movement.

15. An axial flow fan structure comprising an electric motor having a shaft and a fan mounted thereon and having outwardly extending blades, said motor having bearing means supporting the shaft and having a casing with an end portion through which said shaft extends, said casing having an external surface of revolution substantially concentric with said shaft, the improvement of a fan and motor housing comprising a mono-bloc structure having an outer annular wall, a centrally disposed motor support and a plurality of vanes for connecting said motor support to said outer annular wall, said outer annular wall having a first and a second annular portion, said plurality of vanes connecting said centrally disposed motor support to said first annular portion, said second annular portion having an internal cylindrical surface surrounding the fan, said motor support defining a cup-shaped member to receive the said end portion of said motor casing, said motor support having first and second angularly related surfaces, said first angularly related surface constituting an internal surface of revolution substantially concentric both to said motor shaft and to said internal cylindrical surface, said first angularly related surface closely receiving said external surface of revolution of the motor casing and substantially concentrically aligning said external surface of revolution of the motor casing and the shaft with the said internal cylindrical surface, whereby a substantially constant tip clearance is maintained between the fan and said cylindrical surface, said second angularly related surface constituting transversely disposed abutment means against which the end portion of said motor casing longitudinally abuts within said cup-shaped member and through which said shaft extends, and fastening means fastening the motor to the abutment means for holding the motor and shaft against longitudinal movement.

16. An axial flow fan structure comprising an electric motor having a shaft and a fan mounted thereon and having outwardly extending blades, said motor having bearing means supporting the shaft and having a casing with an end portion through which said shaft extends, said casing having an external surface of revolution substantially concentric with said shaft, the improvement of a fan and motor housing comprising a mono-bloc structure having an outer annular wall, a centrally disposed motor support and a plurality of vanes for connecting said motor support to said outer annular wall, said outer annular wall having a first and a second annular portion, said plurality of vanes connecting said centrally disposed motor support to said first annular portion, said second annular portion having an internal cylindrical surface surrounding the fan, said motor support having first and second angularly related surfaces, said first angularly related surface constituting an internal surface of revolution substantially concentric both to said motor shaft and to said internal cylindrical surface, said first angularly related surface closely receiving said external surface of revolution of the motor casing and substantially concentrically aligning said external surface of revolution of the motor casing and the shaft with the said internal cylindrical surface, whereby a substantially constant tip clearance is maintained between the fan and said cylindrical surface, said second angularly related surface constituting transversely disposed abutment means against which the end portion of said motor casing longitudinally abuts and through which said shaft extends, and fastening means fastening the motor to the abutment means for holding the motor and shaft against longitudinal movement, each of said vanes having an entry edge portion, a trailing edge portion and an intermediate curved portion therebetween, said entry edge portion being directed substantially axially of said housing with said trailing edge portion being disposed at an angle thereto.

17. An axial flow fan structure comprising an electric motor having a shaft and a fan mounted thereon, said fan comprising a rotary cylindrical portion with blades extending outwardly therefrom, said motor having bearing means supporting the shaft and having a casing with an end portion through which said shaft extends, said casing having an external surface of revolution substantially concentric with said shaft, the improvement of a fan and motor housing comprising a mono-bloc structure having an outer annular wall, a centrally disposed motor support and a plurality of vanes for connecting said motor support to said outer annular wall having a first and a second annular portion, said plurality of vanes connecting said centrally disposed motor support to said first annular portion, said second annular portion having an internal cylindrical surface surrounding the fan, said motor support defining a cup-shaped member to receive the said end portion of said motor casing, said motor support having first and second angularly related surfaces, said first angularly related surface constituting an internal surface of revolution substantially concentric both to said motor shaft and to said internal cylindrical surface, said first angularly related surface closely receiving said external surface of revolution of the motor casing and substantially concentrically aligning said external surface of revolution of the motor casing and the shaft with the said internal cylindrical surface, whereby a substantially constant tip clearance is maintained between the fan and said cylindrical surface, said second angularly related surface constituting transversely disposed abutment means against which the end portion of said motor casing longitudinally abuts within said cup-shaped member and through which said shaft extends, and fastening means fastening the motor to the abutment means for holding the motor and shaft against longitudinal movement, said vanes each having an edge joining said cup-shaped member at a location longitudinally spaced from said abutment means against which the end of the motor abuts, whereby said cup-shaped member has an overhanging portion projecting longitudinally outwardly from said vanes, said cylindrical portion of said fan extending toward said vanes and longitudinally overlapping the overhanging portion of said cup-shaped member.

18. An axial flow fan structure comprising an electric motor having a shaft and a fan mounted thereon and having outwardly extending blades, said motor having bearing means supporting the shaft and having a casing with an end portion through which said shaft extends, said casing having an outer surface of revolution substantially concentric with said shaft, the improvement of a fan and motor housing comprising a mono-bloc structure having an outer annular wall, a centrally disposed motor support and a plurality of vanes for connecting said motor support to said outer annular wall, said outer annular wall having a first and a second annular portion, said plurality of vanes connecting said centrally disposed motor support to said first annular portion, said second annular portion having an internal cylindrical surface surrounding the fan, said motor support comprising a cup-shaped member having an inner surface of revolution to receive the motor casing and having a transversely disposed end wall against which the end portion of the motor abuts and through which the said shaft extends, said inner surface of revolution of the cup-shaped member being substantially concentric both to said motor shaft and to said internal cylindrical surface, said inner surface of revolution of the cup-shaped member closely receiving said outer surface of revolution of the motor casing and substantially concentrically aligning the motor casing and the shaft with the said internal cylindrical surface, whereby substantially constant tip clearance is maintained between the fan and said cylindrical surface, and fastening means fastening the motor to the transversely disposed end wall of the cup-shaped member for holding the motor and shaft against longitudinal movement.

19. An axial flow fan structure comprising cylindrical means having a driving rotating shaft therein and a fan mounted thereon and having outwardly extending blades, said cylindrical means having bearing means supporting the shaft and having a casing with an end portion through which said shaft extends, said casing having an external surface of revolution substantially concentric with said shaft, the improvement of a housing for the cylindrical means and the fan, said housing comprising a mono-bloc structure having an outer annular wall, a centrally disposed support and a plurality of vanes for connecting said support to said outer annular wall, said outer annular wall having a first and a second annular portion, said plurality of vanes connecting said centrally disposed support to said first annular portion, said second annular portion having an internal cylindrical surface surrounding the fan, said support having first and second angularly related surfaces, said first angularly related surface constituting an internal surface of revolution substantially concentric both to said shaft and to said internal cylindrical surface, said first angularly related surface closely receiving said external surface of revolution of the said casing and substantially concentrically aligning said external surface of revolution of the casing and the shaft with the said internal cylindrical surface, whereby a substantially constant tip clearance is maintained between the fan and said cylindrical surface, said second angularly related surface constituting transversely disposed abutment means against which the end portion of said casing longitudinally abuts and through which said shaft extends, and fastening means fastening the said casing to the abutment means for holding the said casing and shaft against longitudinal movement.

THEODOR H. TROLLER.
CHESTER P. JENKINS.

REFERENCES CITED

The following references are of record in the file of this patent:

UNITED STATES PATENTS

| Number | Name | Date |
|---|---|---|
| 2,073,868 | Fladeland | Mar. 16, 1937 |
| 1,997,506 | Adamcikas et al. | Apr. 9, 1935 |
| 2,219,499 | Troller | Oct. 29, 1940 |
| 2,294,586 | Troller | Sept. 1, 1942 |
| 2,298,576 | McElroy et al. | Oct. 13, 1942 |
| 1,427,859 | Schmidt | Sept. 5, 1922 |
| 2,323,456 | Curley et al. | July 6, 1943 |

FOREIGN PATENTS

| Number | Country | Date |
|---|---|---|
| 442,469 | Great Britain | Feb. 10, 1936 |
| 454,456 | Great Britain | Sept. 23, 1936 |

Certificate of Correction

Patent No. 2,427,032.  September 9, 1947.

THEODOR H. TROLLER ET AL.

It is hereby certified that errors appear in the printed specification of the above numbered patent requiring correction as follows: Column 5, line 3, after the word "motor" strike out "and"; lines 11 and 12, for "fastend" read *fastening*; lines 41 and 42, for "fastending" read *fastening*; column 14, list of references cited, under "Foreign Patents", for "454,456" read *454,072*; and that the said Letters Patent should be read with these corrections therein that the same may conform to the record of the case in the Patent Office.

Signed and sealed this 16th day of March, A. D. 1948.

[SEAL]

THOMAS F. MURPHY,
*Assistant Commissioner of Patents.* nally abuts and through which said shaft extends, and fastening means fastening the said casing to the abutment means for holding the said casing and shaft against longitudinal movement.

THEODOR H. TROLLER.
CHESTER P. JENKINS.

REFERENCES CITED

The following references are of record in the file of this patent:

UNITED STATES PATENTS

| Number | Name | Date |
|---|---|---|
| 2,073,868 | Fladeland | Mar. 16, 1937 |
| 1,997,506 | Adamcikas et al. | Apr. 9, 1935 |
| 2,219,499 | Troller | Oct. 29, 1940 |
| 2,294,586 | Troller | Sept. 1, 1942 |
| 2,298,576 | McElroy et al. | Oct. 13, 1942 |
| 1,427,859 | Schmidt | Sept. 5, 1922 |
| 2,323,456 | Curley et al. | July 6, 1943 |

FOREIGN PATENTS

| Number | Country | Date |
|---|---|---|
| 442,469 | Great Britain | Feb. 10, 1936 |
| 454,456 | Great Britain | Sept. 23, 1936 |

Certificate of Correction

Patent No. 2,427,032. September 9, 1947.

THEODOR H. TROLLER ET AL.

It is hereby certified that errors appear in the printed specification of the above numbered patent requiring correction as follows: Column 5, line 3, after the word "motor" strike out "and"; lines 11 and 12, for "fastend" read *fastening*; lines 41 and 42, for "fastending" read *fastening*; column 14, list of references cited, under "Foreign Patents", for "454,456" read *454,072*; and that the said Letters Patent should be read with these corrections therein that the same may conform to the record of the case in the Patent Office.

Signed and sealed this 16th day of March, A. D. 1948.

[SEAL]

THOMAS F. MURPHY,
*Assistant Commissioner of Patents.*